US012567427B2

(12) United States Patent
Takahashi

(10) Patent No.: US 12,567,427 B2
(45) Date of Patent: Mar. 3, 2026

(54) INFORMATION PROCESSING APPARATUS, INFORMATION PROCESSING METHOD, AND PROGRAM FOR VOICE QUALITY CONVERSION

(71) Applicant: Sony Group Corporation, Tokyo (JP)

(72) Inventor: Naoya Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 168 days.

(21) Appl. No.: 18/571,738

(22) PCT Filed: Feb. 9, 2022

(86) PCT No.: PCT/JP2022/005001

§ 371 (c)(1),
(2) Date: Dec. 19, 2023

(87) PCT Pub. No.: WO2023/276234

PCT Pub. Date: Jan. 5, 2023

(65) Prior Publication Data

US 2024/0135945 A1 Apr. 25, 2024

(30) Foreign Application Priority Data

Jun. 29, 2021 (JP) ................................ 2021-107651

(51) Int. Cl.
*G10L 21/007* (2013.01)
*G10L 21/028* (2013.01)

(52) U.S. Cl.
CPC .......... *G10L 21/007* (2013.01); *G10L 21/028* (2013.01)

(58) Field of Classification Search
CPC ................ G10L 21/007; G10L 21/028; G10L 2021/0135; G10L 25/30; G10H 1/366
See application file for complete search history.

(56) References Cited

U.S. PATENT DOCUMENTS 10,854,182 B1 12/2020 Huang
2009/0281807 A1* 11/2009 Hirose .................... G10L 21/00 704/E15.005
2010/0070283 A1* 3/2010 Kato ....................... G10L 21/02 704/E21.001

(Continued)

FOREIGN PATENT DOCUMENTS

CN 113781993 A 12/2021
JP 2001-117598 A 4/2001

(Continued)

OTHER PUBLICATIONS

International Search Report and Written Opinion mailed on Apr. 26, 2022, received for PCT Application PCT/JP2022/005001, filed on Feb. 9, 2022, 13 pages including English Translation.

(Continued)

*Primary Examiner* — Michael N Opsasnick
(74) *Attorney, Agent, or Firm* — XSENSUS LLP

(57) ABSTRACT

For example, an effective voice quality conversion process is performed.
An information processing apparatus includes: a voice quality conversion unit that performs sound source separation of a vocal signal and an accompaniment signal from a mixed sound signal and performs voice quality conversion using a result of the sound source separation.

18 Claims, 9 Drawing Sheets

(56) References Cited

U.S. PATENT DOCUMENTS

| | | | | |
|---|---|---|---|---|
| 2010/0250257 | A1* | 9/2010 | Hirose | G10L 13/033<br>704/E21.001 |
| 2012/0065978 | A1* | 3/2012 | Villavicencio | G10L 21/003<br>704/258 |
| 2013/0151256 | A1* | 6/2013 | Nakano | G10L 13/0335<br>704/268 |
| 2013/0238337 | A1* | 9/2013 | Kamai | G10L 21/003<br>704/258 |
| 2015/0310850 | A1* | 10/2015 | Nakano | G10H 1/0066<br>704/258 |
| 2018/0342258 | A1* | 11/2018 | Huffman | G10L 21/013 |
| 2021/0225383 | A1* | 7/2021 | Takahashi | G10L 21/028 |
| 2021/0280165 | A1* | 9/2021 | Yu | G10L 13/047 |

FOREIGN PATENT DOCUMENTS

| | | | |
|---|---|---|---|
| JP | 2018-005048 | A | 1/2018 |
| KR | 10-2020-0065248 | A | 6/2020 |
| WO | 2019/116889 | A1 | 6/2019 |

OTHER PUBLICATIONS

Deng et al., "PitchNet: Unsupervised Singing Voice Conversion With Pitch Adversarial Network", arXiv:1912.01852v2 [cs.SD], Feb. 18, 2020, 5 pages.

Qian et al., "AUTOVC: Zero-Shot Voice Style Transfer with Only Autoencoder Loss", arXiv:1905.05879v2 [eess.AS], Jun. 6, 2019, 12 pages.

Yamada et al., "Singing voice processing in music based on singing voice separation and statistical singing voice quality conversion", IPSJ SIG Technical Report, vol. 2017-MUS-115. No. 30, Jun. 17, 2017, pp. 1-6.

Naoya Takahashi et al: "Robust One-Shot Singing Voice Conversion", arxiv.org, Cornell University Library, 201 Olin Library Cornell University Ithaca, NY14853, Oct. 20, 2022 (Oct. 20, 2022), XP091349372.

Ren et al: "DeepSinger: Singing Voice Synthesis with Data Mined From the Web", Proc. 26th ACM SIG KDD International Conference on Knowledge Discovery & Data Mining, Aug. 23, 2020 (Aug. 23, 2020), pp. 1979-1989, XP058733772.

* cited by examiner

INFORMATION PROCESSING APPARATUS, INFORMATION PROCESSING METHOD, AND PROGRAM FOR VOICE QUALITY CONVERSION

CROSS-REFERENCE TO RELATED APPLICATIONS

The present application is based on PCT filing PCT/JP2022/005001, filed Feb. 9, 2022, which claims priority from Japanese Patent Application No. 2021-107651, filed Jun. 29, 2021, the entire contents of each are incorporated herein by reference.

TECHNICAL FIELD

The present disclosure relates to an information processing apparatus, an information processing method, and a program.

BACKGROUND ART

A voice quality conversion technology for converting a voice quality of one's own speech (including singing) into a voice quality of another company has been proposed. The voice quality is a human voice generated by an utterer, and refers to an attribute of a voice perceived by a listener over a plurality of voice units (for example, phonemes), and more specifically, refers to an element that is made closer if there is a difference depending on the listener even if the speech has the same sound pitch and tone. Patent Document 1 below describes a voice quality conversion technology for converting a general speech voice into a voice quality of another utterer while maintaining a speech content.

CITATION LIST

Patent Document

Patent Document 1: Japanese Patent Application Laid-Open

SUMMARY OF THE INVENTION

Problems to be Solved by the Invention

In this field, it is desirable to perform an appropriate voice quality conversion process.

An object of the present disclosure is to provide an information processing apparatus, an information processing method, and a program for performing an appropriate voice quality conversion process.

Solutions to Problems

The present disclosure provides, for example, an information processing apparatus including a voice quality conversion unit that performs sound source separation of a vocal signal and an accompaniment signal from a mixed sound signal and performs voice quality conversion using a result of the sound source separation.

The present disclosure provides, for example, an information processing method including performing, by a voice quality conversion unit, sound source separation of a vocal signal and an accompaniment signal from a mixed sound signal and performing voice quality conversion using a result of the sound source separation.

The present disclosure provides, for example, a program for causing a computer to execute an information processing method including performing, by a voice quality conversion unit, sound source separation of a vocal signal and an accompaniment signal from a mixed sound signal and performing voice quality conversion using a result of the sound source separation.

MODE FOR CARRYING OUT THE INVENTION

Figure 1:
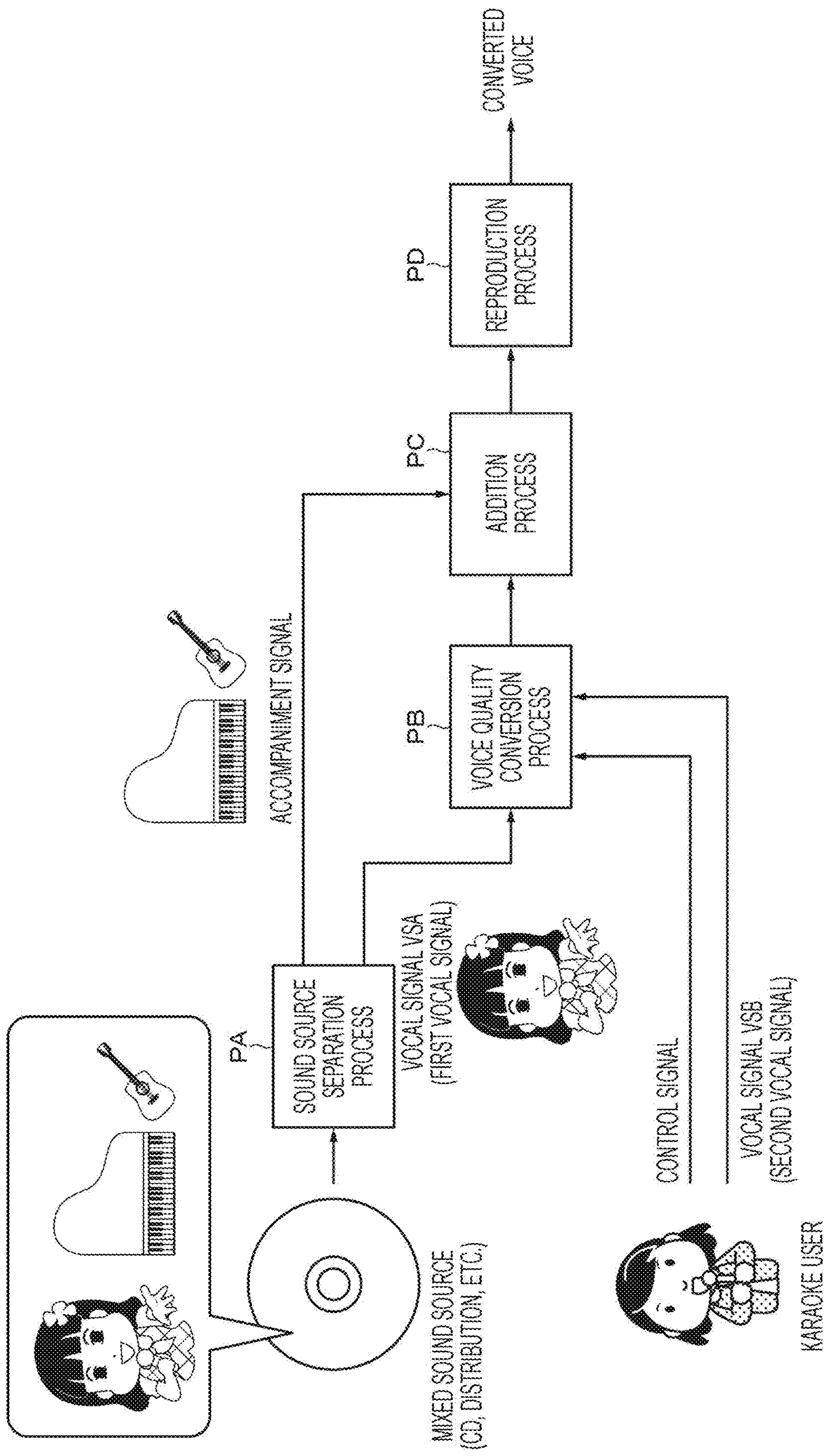
FIG. 1 is a diagram for describing an outline of one embodiment.

Hereinafter, embodiments and the like of the present disclosure will be described with reference to the drawings. Note that the description will be given in the following order.

Background of Present Disclosure

One Embodiment

Modified Examples

The embodiment and the like to be described hereinafter are preferred specific examples of the present disclosure, and the content of the present disclosure is not limited to the embodiments and the like.

Background of Present Disclosure

First, the background of the present disclosure will be described in order to facilitate understanding of the present disclosure. In recent years, in karaoke, sound source separation has been increasingly performed on an original sound source containing a vocal voice to obtain a vocal signal and an accompaniment signal and use the separated accompaniment signal, instead of using a previously-created musical instrument digital interface (MIDI) sound source or recorded sound source as an accompaniment.

With the development of such a sound source separation technology, it is possible to obtain advantages such as cost reduction in accompaniment sound source creation and enjoyment of karaoke with the original music as it is. Meanwhile, effects such as reverberation, a chorus added by changing a pitch of a singing voice, and a voice changer that changes a voice quality to an unspecified voice quality are generally used in the karaoke, but it is still difficult to make a change to a singing voice of a specific person. Therefore, for example, it is difficult to smoothly convert a voice quality to a voice quality of a specific singer, such as “bringing one’s voice a little closer to a voice of an artist of an original song”.

There is proposed a voice quality conversion technology for converting a general speech voice into a voice quality of another utterer while maintaining a speech content as in the technology described in Patent Document 1 described above. In general, however, a singing voice has more variations in sound pitch and voice quality and various musical expression methods (vibrato and the like) than an ordinary speech, and conversion of the singing voice is difficult. Therefore, at present, it is possible to perform only conversion to an unspecified voice quality such as conversion into a robot style or an animation style and gender conversion, and voice quality conversion of a specific utterer from which a sufficient amount of clean voice can be obtained in advance, and it is difficult to perform conversion to an utterer from which a sufficient amount of clean voice cannot be obtained in advance. In general, it takes a lot of time and cost to obtain a sufficient amount of clean voice, and for example, it is substantially very difficult to perform voice quality conversion into a voice of a famous singer.

Furthermore, it is more difficult to perform high-quality conversion for the use in karaoke because it is necessary to perform voice quality conversion in real time, and future information cannot be used. In addition, a sound source separated by sound source separation may include noise generated at the time of the sound source separation, a voice converted with reference to such a separated voice is likely to include a lot of noise, and is hardly converted with higher quality. One embodiment of the present disclosure will be described in detail in consideration of the above points.

One Embodiment

Outline of One Embodiment

First, an outline of one embodiment will be described with reference to FIG. 1. A sound source separation process PA is performed on a mixed sound source illustrated in FIG. 1. The mixed sound source can be provided by distribution via a recording medium such as a compact disc (CD) or a network. The mixed sound source includes, for example, an artist’s vocal signal (this is an example of a first vocal signal, and hereinafter, also referred to as a vocal signal VSA as appropriate). Furthermore, the mixed sound source includes a signal (a musical instrument sound or the like, and hereinafter, also referred to as an accompaniment signal as appropriate) other than the vocal signal VSA.

Meanwhile, a voice of singing of a karaoke user is collected by a microphone or the like. The voice of singing of the user (an example of a second vocal signal) is also referred to as a vocal signal VSB as appropriate.

A voice quality conversion process PB is performed on the vocal signal VSA and the vocal signal VSB. In the voice quality conversion process PB, a process of bringing any one vocal signal of the vocal signal VSA and the vocal signal VSB closer (similar) to the other vocal signal is performed. At this time, it is possible to set a change amount for bringing the any one vocal signal closer to the other vocal signal according to a predetermined control signal. For example, a voice quality conversion process of bringing the vocal signal VSB of the karaoke user closer to the vocal signal VSA of the artist is performed. Then, an addition process PC for adding the vocal signal VSB subjected to the voice quality conversion process and the accompaniment signal is performed, and a reproduction process PD is performed on a signal obtained by the addition process PC.

Therefore, a singing voice of the user subjected to the voice quality conversion process to approximate the vocal signal of the artist is reproduced.

Configuration Example of Information Processing Apparatus

Overall Configuration Example

Figure 2:
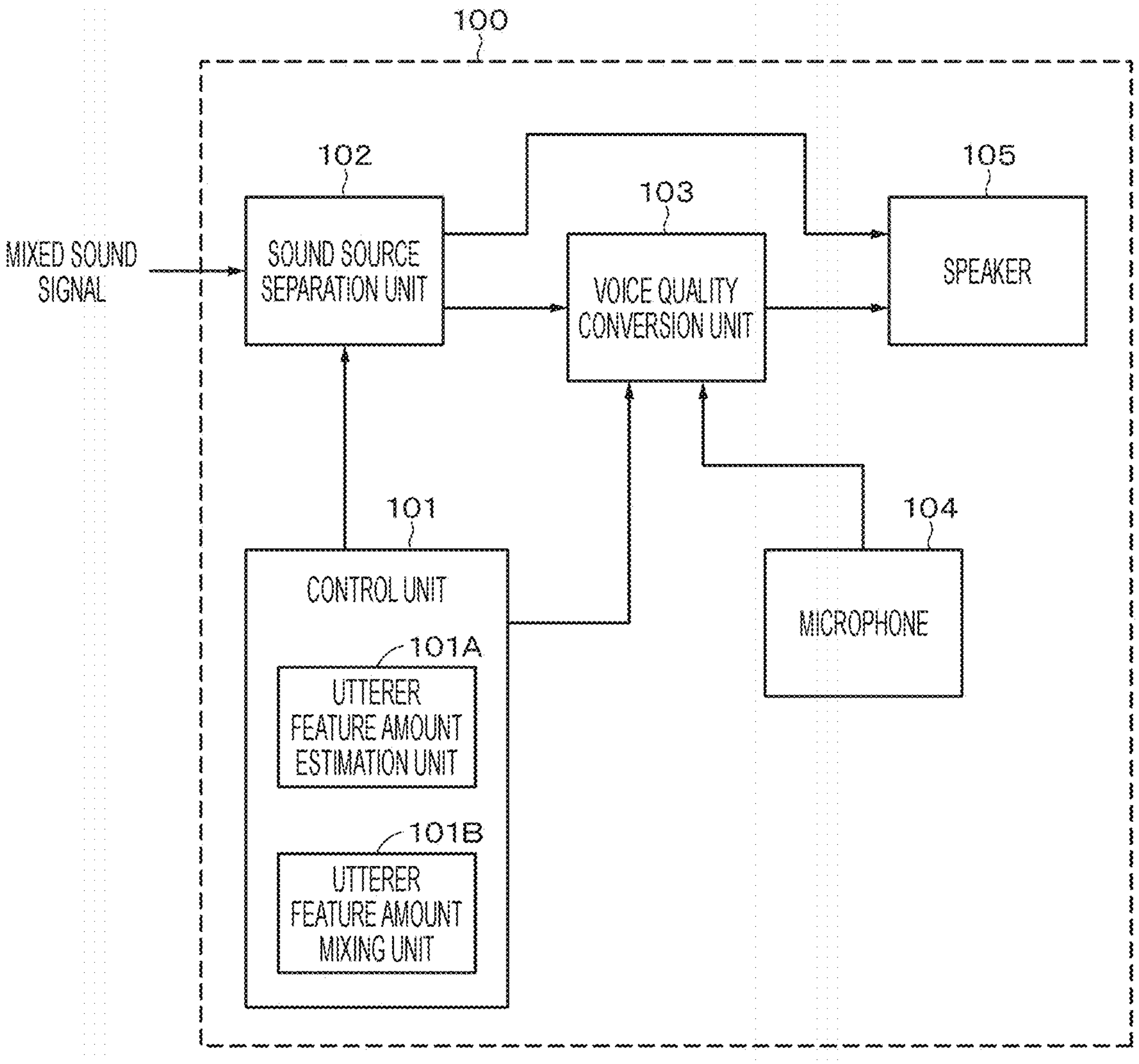
FIG. 2 is a block diagram illustrating a configuration example of a smartphone according to the embodiment.

FIG. 2 is a block diagram illustrating a configuration example of an information processing apparatus according to the embodiment. Examples of the information processing apparatus according to the present embodiment include a smartphone (smartphone 100). A user can easily perform karaoke with voice quality conversion using the smartphone 100. Note that karaoke, that is, singing is described as an example in the present embodiment, but the present disclosure is not limited to singing, and can be applied to a voice quality conversion process for a speech such as conversation. Furthermore, the information processing apparatus according to the present disclosure is applicable not only to the smartphone but also to a portable electronic device such as a smart watch, a personal computer, a stationary karaoke device, or the like.

The smartphone 100 includes, for example, a control unit 101, a sound source separation unit 102, a voice quality conversion unit 103, a microphone 104, and a speaker 105.

The control unit 101 integrally controls the entire smartphone 100. The control unit 101 is configured as, for example, a central processing unit (CPU), and includes a read only memory (ROM) in which a program is stored, a random access memory (RAM) used as a work memory, and the like (note that illustration of these memories is omitted).

The control unit 101 includes an utterer feature amount estimation unit 101A as a functional block. The utterer feature amount estimation unit 101A estimates a feature amount corresponding to a feature that does not change with time as singing progresses, specifically, a feature amount related to an utterer (hereinafter, appropriately referred to as an utterer feature amount).

Furthermore, the control unit 101 includes a feature amount mixing unit 101B as a functional block. The feature amount mixing unit 101B mixes, for example, two or more utterer feature amounts with appropriate weights.

The sound source separation unit 102 separates an input mixed sound signal into a vocal signal and an accompaniment signal (a sound source separation process). The vocal signal obtained by the sound source separation is supplied to the voice quality conversion unit 103. Furthermore, the accompaniment signal obtained by the sound source separation is supplied to the speaker 105.

The voice quality conversion unit 103 performs a voice quality conversion process such that a voice quality of the vocal signal corresponding to a singing voice of the user collected by the microphone 104 approximates the vocal signal obtained by the sound source separation by the sound source separation unit 102. Note that details of the process performed by the voice quality conversion unit 103 will be described later. Note that the voice quality in the present embodiment includes feature amounts such as a sound pitch and volume in addition to the utterer feature amount.

The microphone 104 collects, for example, singing or a speech (singing in this example) of the user of the smartphone 100. A vocal signal corresponding to the collected singing is supplied to the voice quality conversion unit 103.

An addition unit (not illustrated) adds the accompaniment signal supplied from the sound source separation unit 102 and the vocal signal output from the voice quality conversion unit 103. An added signal is reproduced through the speaker 105.

Note that the smartphone 100 may have a configuration (for example, a display or a button configured as a touch panel) other than the configurations illustrated in FIG. 2.

Configuration Example of Voice Quality Conversion Unit

Figure 3:
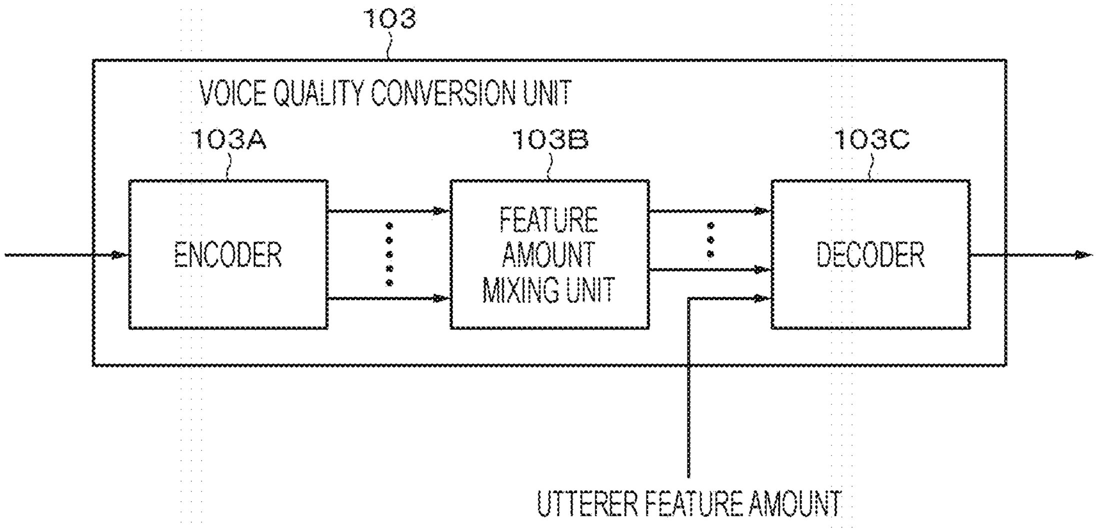
FIG. 3 is a block diagram illustrating a configuration example of a voice quality conversion unit according to the embodiment.

FIG. 3 is a block diagram illustrating a configuration example of the voice quality conversion unit 103. The voice quality conversion unit 103 includes an encoder 103A, a feature amount mixing unit 103B, and a decoder 103C. The encoder 103A extracts a feature amount from a vocal signal using a learning model obtained by predetermined learning. The feature amount extracted by the encoder 103A is, for example, a feature amount that changes with time as singing progresses, and specifically includes at least one of sound pitch information, volume information, or speech (lyric) information.

The feature amount mixing unit 103B mixes the feature amount extracted by the encoder 103A. The feature amount mixed by the feature amount mixing unit 103B is supplied to the decoder 103C.

The decoder 103C generates a vocal signal on the basis of the feature amount supplied from the feature amount mixing unit 103B and the utterer feature amount.

Regarding Learning Performed by Voice Quality Conversion Unit

Figure 4:
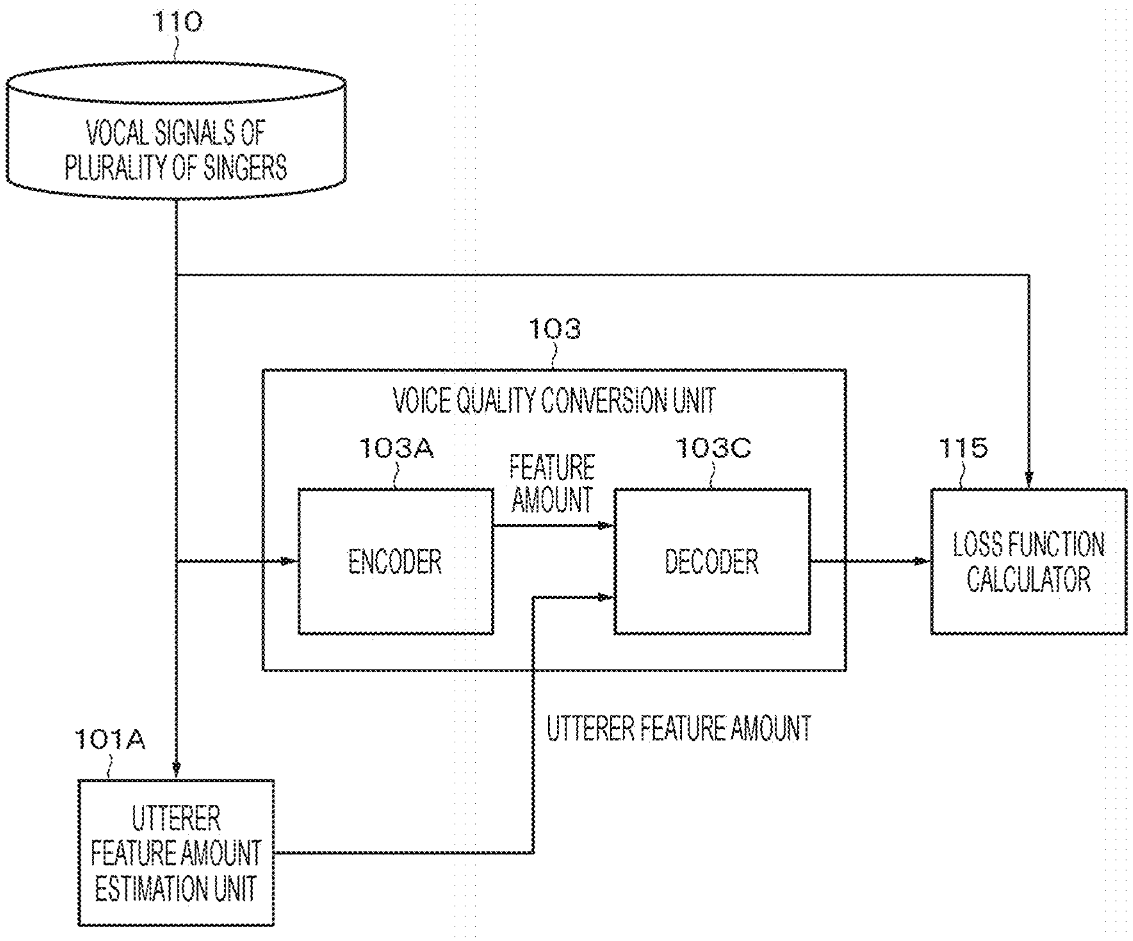
FIG. 4 is a diagram for describing an example of learning performed by the voice quality conversion unit according to the embodiment.

Next, an example of a learning method performed by the voice quality conversion unit 103 will be described with reference to FIG. 4. Note that in FIG. 4, illustration of the feature amount mixing unit 103B in the voice quality conversion unit 103 and the feature amount mixing unit 101B is omitted.

At the time of learning, the voice quality conversion unit 103 is learned using vocal signals (which may include an ordinary speech) of a plurality of singers. The vocal signals may be pieces of parallel data in which the plurality of singers sings the same content, or are not necessarily the parallel data. In the present example, it is treated as non-parallel data that is more realistic and difficult to learn. As illustrated in FIG. 4, the vocal signals of the plurality of singers are stored in an appropriate database 110.

A predetermined vocal signal is input to the utterer feature amount estimation unit 101A and the encoder 103A as input singing voice data x. The utterer feature amount estimation unit 101A estimates an utterer feature amount from the input singing voice data x. Furthermore, the encoder 103A extracts, for example, sound pitch information, volume information, and a speech content (lyrics) as examples of the feature amount from the input singing voice data x. These feature amounts are defined by, for example, embedding vectors represented by multidimensional vectors. Each of the feature amounts defined by the embedding vector is appropriately referred to as follows:

an utterer embedding;

$e^{id}$ a sound pitch embedding;

$e^{pitch}$ a volume embedding; and $e^{loud}$ a content embedding $e^{cont}$.

The decoder 103C performs a process of constructing a voice with these feature amounts as inputs. At the time of learning, the decoder 103C performs learning such that an output of the decoder 103C reconstructs the input singing voice data x. For example, the decoder 103C performs learning so as to minimize a loss function between the input singing voice data x calculated by the loss function calculator 115 illustrated in FIG. 4 and the output of the decoder 103C.

Since the utterer feature amount estimation unit 101A and the encoder 10AC are learned such that each embedding reflects only the corresponding feature and does not have information of the other features, it is possible to convert only the corresponding feature by replacing one embedding with another one at the time of inference. For example, when only the utterer embedding $e^{id}$ is replaced with that of another person, it is possible to convert a voice quality (voice quality in a narrow sense not including a sound pitch) while maintaining the sound pitch, volume, and speech content. As a method of obtaining an embedding vector that separates features in this manner, there are a method of obtaining an embedding from a feature amount reflecting only a specific feature and a method of learning an encoder that extracts only a specific feature from data (a predetermined vocal signal).

As the former, there are a method of extracting a base sound f0 by a base sound extractor and obtaining a sound pitch embedding $e^{pitch}=E^{pitch}(f_0)$, a method of obtaining a volume embedding $e^{loud}=E^{loud}(p)$ from average power p, a method of obtaining an utterer embedding $e^{loud}=E^{loud}(p)$ from an utterer label n, a method of obtaining a feature amount $v^{ASR}$ obtained from voice recognition, a method of obtaining a content embedding $e^{cont}=E^{cont}(v^{ASR})$ from automatic speech recognition, and the like.

As the latter method (a method of learning an encoder that extracts only a specific feature from data), a technique based on information loss by adversarial learning or quantization can be considered. For example, the adversarial learning is used to obtain each of a sound pitch embedding, $e^{pitch}$ a volume embedding, and $e^{loud}$ an utterer embedding $e^{id}$.

Furthermore, a content embedding $e^{cont}$ in which it is difficult to acquire a correct label can be obtained by learning using data.

As a specific example, an example of learning performed by the encoder 103A that extracts the content embedding $e^{cont}$ will be described. First, a specific example using a technique based on adversarial learning will be described.

An encoder $E^{cont}(x, \theta^{cont})$ that extracts a content embedding $e^{cont}$ from the input singing voice data x can be learned by adding a loss function $L^j$ that uses a critic $C^j$ for estimating another feature amount $y^j$ from the content embedding $e^{cont}$ to a loss function $L^{rec}$ regarding reconfiguration of an input.

Specifically, learning is performed using the following formula.

$$L_{ED}(\theta) =$$

$$L_{rec}(x, D(E^{id}(n, \theta^{id}), E^{pitch}(f_0, \theta^{pitch}), E^{loud}(p, \theta^{loud}), E^{cont}(x, \theta^{cont}), \theta^{dec})) - \sum_{j \neq i} \lambda_j L^j(C^j(E^{cont}(x, \theta^{cont}), \phi^j), y^j)$$

$$L_{cj}(\phi^j) = L^j(C^j(E^{cont}(x, \theta^{cont}), (\phi^j), y^j)$$

However, in the formula described above, $L_{ED}$ represents a loss function for learning of the encoder 103A and the decoder 103C.

Furthermore, $L_{cj}$ is the loss function for the critic $C^j$ and $\lambda_j$ is a weight parameter.

$\theta^{id}$ $\theta^{pitch}$ $\theta^{loud}$ $\theta^{cont}$ $\theta^{dec}$ are parameters of the encoder 103A and the decoder 103C, and $\phi^j$ is a parameter of the critic $C^j$.

Next, a specific example of a technique based on information loss by quantization will be described.

When an output of an encoder $E^{cont}(x, \theta^{cont})$ that extracts a content embedding $e^{cont}$ from the input singing voice data x is vector-quantized and information is compressed, a content embedding $e^{cont}$ can be induced to hold only information that is not included in other information $(e^{id}, e^{pitch}, e^{loud})$ given to the decoder.

The learning can be performed by minimization of the following loss function.

$$L(\theta)=L_{rec}(x, D(E^{id}(n, \theta^{id}), E^{pitch}(f_0, \theta^{pitch}), E^{loud}(p, \theta^{loud}), E^{cont}(x, \theta^{cont}), \theta^{dec}))+|sg(E(x)-V(E(x)))|^2+\beta|E(x)-sg(V(E(x)))|^2$$

Here, sg( )is a stop-gradient operator that does not transmit gradient information of a neural network to the following layers, and V( )is a vector quantization operation.

Regarding a loss function for reconfiguration $L^{rec}$, various forms are conceivable depending on types of a decoder and an encoder. For example, an evidence of lower bound (ELBO)

$$L_{rec}=\mathbb{E}[\log(p(X|e^{id}, e^{pitch}, e^{loud}, e^{cont}))]-D_{KL}[q(e^{id}, e^{pitch}, e^{loud}, e^{cont}|X)\|p(e^{id}, e^{pitch}, e^{loud}, e^{cont})]$$

can be used in the case of a variational autoencoder (VAE) or a vector quantization VAE. In the case of a generative adversarial network, it can be expressed as a weighted sum of (the following formula) of an input, an output situation error, and an adversarial loss $L_{adv}$.

$$L_{rec}=\|x=D(e^{id}, e^{pitch}, e^{loud}, e^{cont})\|^2+\lambda L_{adv}$$

The above-described learning is performed without changing utterer information estimated by the utterer feature amount estimation unit. Once learned, the utterer information may change. Furthermore, future information may be used at the time of learning.

In the above, the description has been given regarding a method of obtaining the utterer embedding for determining a voice quality as $e^{id}=E^{id}(n)$ using the utterer label n. In this method, however, a conversion destination singer needs to be included in learning data in advance, and voice quality conversion cannot be performed on an arbitrary singer (unknown utterer). In this regard, a method of obtaining the utterer embedding from a voice signal will be described. For example, the following two methods are conceivable.

A first method is a method of performing utterer embedding estimation for estimating utterer information of a predetermined utterer (for example, an utterer of singing voice data having a feature similar to that of singing voice data of a singer as a conversion destination) on the basis of a vocal signal of the utterer. An utterer feature amount estimation unit F( ) that estimates an utterer embedding $$e_n^{id}=E^{id}(n)$$

learned using the utterer label n from a singing sound of an utterer n $x_n$ is learned. F can be configured by a neural network or the like, and is learned to minimize a distance to the utterer embedding. As the distance, an Lp norm $$\left\|e_n^{id}-F(x_n)\right\|_p$$

can be used.

A second method is a method of performing singer identification model learning to estimate utterer information of an utterer on the basis of a predetermined vocal signal.

An utterer feature amount estimation unit G( )that extracts an utterer embedding $e_n^{id}$ from the singing sound $x_n$ is learned prior to the learning of the voice quality conversion unit 103. G can be learned by minimizing the following objective function L using singing sound data of a plurality of singers with singer labels.

$$L=-\min(K(G(x_n),\ G(x_m))-K(G(x_n),\ G(x'_n))-1,\ 0)$$

Here, K(x, y) is a cosine distance between x and y, $x_n$, $x_n'$ is a different voice of singing of the singer n, and $x_n$ is a voice of singing of a singer (m≠n).

The utterer embedding $e_n^{id}$ is obtained as follows using G learned in this manner, and is used to learn the voice quality conversion unit 103.

$$e_n^{id}=\frac{G(x_n)}{|G(x_n)|}$$

In any of the methods described above, it is preferable that the input voice input to the utterer feature amount estimation unit G( )be sufficiently long in order to obtain an accurate utterer embedding. This is because a feature of a singer cannot be sufficiently extracted from a short voice. On the other hand, an excessively long input has a disadvantage that the necessary memory becomes enormous. In this regard, for G( ), a recurrent neural network having a recursive structure can be used, or an average of utterer embeddings obtained using a plurality of short-time segments, or the like can be used.

Operation Example

The voice quality conversion is performed by the voice quality conversion unit 103 learned as described above. The voice quality conversion process performed by the smartphone 100 will be described with reference to FIG. 5.

Figure 5:
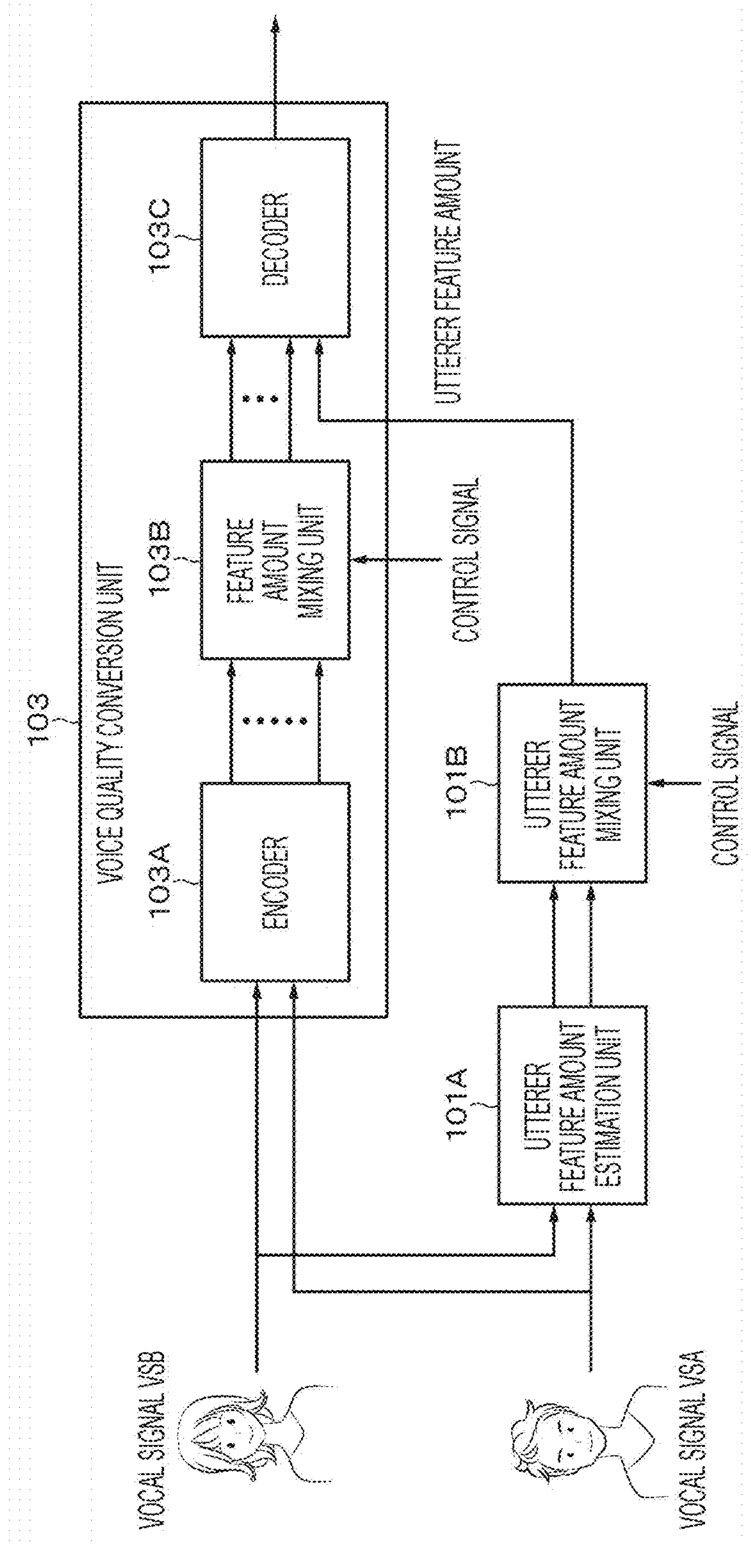
FIG. 5 is a diagram that is referred to in describing an operation of the smartphone according to the embodiment.

In FIG. 5, the vocal signal VSB is singing voice data of a karaoke user. Furthermore, the vocal signal VSA is singing voice data of a singer whose voice quality is desired to be made closer by the karaoke user, and is a vocal signal obtained by sound source separation.

Each of the vocal signal VSA and the vocal signal VSB is input to the voice quality conversion unit 103. The encoder 103A extracts feature amounts such as a sound pitch and volume from the vocal signal VSA and the vocal signal VSB.

For example, a control signal designating a feature amount to be replaced is input to the feature amount mixing unit 103B. For example, in a case where a control signal for converting sound pitch information extracted from the vocal signal VSB into sound pitch information extracted from the vocal signal VSA is input, the feature amount mixing unit 101B replaces the sound pitch information extracted from the vocal signal VSB with the sound pitch information extracted from the vocal signal VSA. The feature amount mixed by the feature amount mixing unit 101B is input to the decoder 103C.

The vocal signal VSA and the vocal signal VSB are input to the utterer feature amount estimation unit 101A. The utterer feature amount estimation unit 101A estimates utterer information from each of the vocal signals. The estimated utterer information is supplied to the feature amount mixing unit 101B.

A control signal indicating whether or not to replace an utterer feature amount and how much weight for replacement of the utterer feature amount in the case of replacement is input to the feature amount mixing unit 101B. In accordance with the control signal, the feature amount mixing unit 101B appropriately replaces the utterer feature amount. For example, in a case where an utterer feature amount obtained from the vocal signal VSB is replaced with an utterer feature amount obtained from the vocal signal VSA, a voice quality (voice quality in a narrow sense) defined by the utterer feature amount is replaced from a voice quality of the karaoke user to a voice quality of the singer corresponding to the vocal signal VSA. The utterer feature amount mixed by the feature amount mixing unit 101B is supplied to the decoder 103C.

The decoder 103C generates singing voice data on the basis of the feature amount supplied from the feature amount mixing unit 101B and the utterer feature amount supplied from the feature amount mixing unit 101B. The generated singing voice data is reproduced through the speaker 105. Therefore, a singing voice in which a part of the voice quality of the karaoke user has been replaced with a part of the voice quality of the singer, such as a professional, is reproduced.

Processing Performed in Association with Voice Quality Conversion Process

Next, processing performed in association with the voice quality conversion process will be described. First, processing for realizing smooth voice quality conversion will be described. There is a demand for enjoyment while changing one's own singing voice to a singing voice of a singer of an original song for use in karaoke or the like. This can be realized by, for example, replacing an utterer embedding of a singer A $$e_A^{id}$$

with an utterer embedding of a singer B $$e_B^{id}$$

in order to change a singing voice of the singer A (oneself) to the voice quality of another singer (singer of the original song) at the time of inference (at the time of executing the voice quality conversion process).

However, for use in karaoke or the like, there is a demand that the own singing voice is not completely changed to the voice quality of the singer B, but the singer B is slightly imitated. In order to realize this, an interpolation function $$g(e_A^{id}, e_B^{id}, \alpha)$$

for smoothly changing the utterer embedding of the singer A $$e_A^{id}$$

to the utterer embedding of the singer B $$e_B^{id}$$

is used. Here, α is a scalar variable for determining a change amount, and can also be determined by a user. Linear interpolation or spherical linear interpolation can be used as the interpolation function.

Note that, in addition to $$e_A^{id},$$

$$e^{pitch},$$

$$e^{loud},$$

and $$e^{cont}$$

can also be interpolated similarly using linear interpolation or spherical linear interpolation. For example, in a case where a tone of the karaoke user $$f_0^{original}$$

is desired to be brought closer to a tone of a singer of an original sound source $$f_0^{target},$$

linear interpolation can be performed as follows.

$$E^{pitch}(\beta f_0^{original}+(1-\beta)f_0^{target}, \theta^{pitch})$$

Next, real-time processing will be described. Many general algorithms of singing voice conversion are performed by batch processing using past and future information. On the other hand, real-time conversion is required in the case of being used in karaoke or the like. At this time, future information cannot be used, and thus, it is difficult to perform high-quality conversion.

In this regard, the present embodiment focuses on a relationship of parallel data that speech (lyrics) has the same content between singing in the original sound source and the user's singing in the voice quality conversion in karaoke in many cases, and enables the high-quality conversion even in the real-time processing using such a feature. Hereinafter, a specific example of processing for realizing such conversion will be described.

First, the encoder 103A and the decoder 103C provided in the voice quality conversion unit 103 are all set as functions that do not use future information. In a case where the encoder 103A and the decoder 103C are configured using a recurrent neural network (RNN) or a convolutional neural network (CNN), this can be realized by forming the encoder 103A and the decoder 103C using a unidirectional RNN or causal convolution that does not use future information.

Therefore, the processing can be performed in real time. However, it is necessary to obtain an utterer embedding on the basis of a sufficiently long input for accurate estimation, and thus, an input with a sufficient length cannot be obtained for a while immediately after the start of singing, and the high-quality conversion is difficult. In this regard, in the voice quality conversion in karaoke, it is conceivable to use the relationship of parallel data at the time of inference and use only an input for a short time for estimation of the utterer embedding. Here, the short time is a duration of a voice of singing including one or a small number of phonemes, and is, for example, about several 100 milliseconds to several seconds. In general, voice quality conversion between the same phonemes of different utterers is relatively easy, and conversion can be performed with high quality. In this regard, when the utterer embedding is made dependent on phonemes, the high-quality conversion can be performed even with short-time information. However, a situation in which there is no parallel data at the time of learning is assumed, and thus, it is necessary to learn a model under a constraint that the utterer embedding is time-invariant. That is, it is not possible to simply obtain the utterer embedding from the short-time information, in other words, it is not possible to learn the phoneme-dependent utterer embedding.

In this regard, the encoder 103 A and the decoder 103C are learned with time-invariant utterer embeddings, and an utterer feature amount estimation machine $$F^{short}(\ )$$

that freezes parameters of these models and estimates an abnormal utterer embedding using these models is learned. Therefore, the utterer embedding at the time of performing the present processing is treated as an abnormal feature amount.

An objective function for learning of $$F^{short}$$

can be expressed as $$L(\psi)=L_{rec}(x, D(F^{short}(x, \psi), e^{pitch}, e^{loud}, e^{cont})).$$

Here, it should be noted that the parameters of the encoder 103A and the decoder 103C are fixed.

The receptive field of $$F^{short}$$

is limited to the short time described above, and is obtained by minimizing the objective function described above.

An utterer feature amount estimation unit F learned in this manner is an estimator that obtains an utterer embedding dependent on the speech content (phoneme) designated by $$e^{cont},$$

and enables the high-quality conversion in real time on the basis of only the short-time information.

On the other hand, when singing continues for a certain long time and an utterer embedding can be obtained from a sufficiently long input voice, temporal stability is sometimes higher in the case of using the utterer feature amount estimation unit F that has performed the learning described with reference to FIG. 4 and the like.

Figure 6:
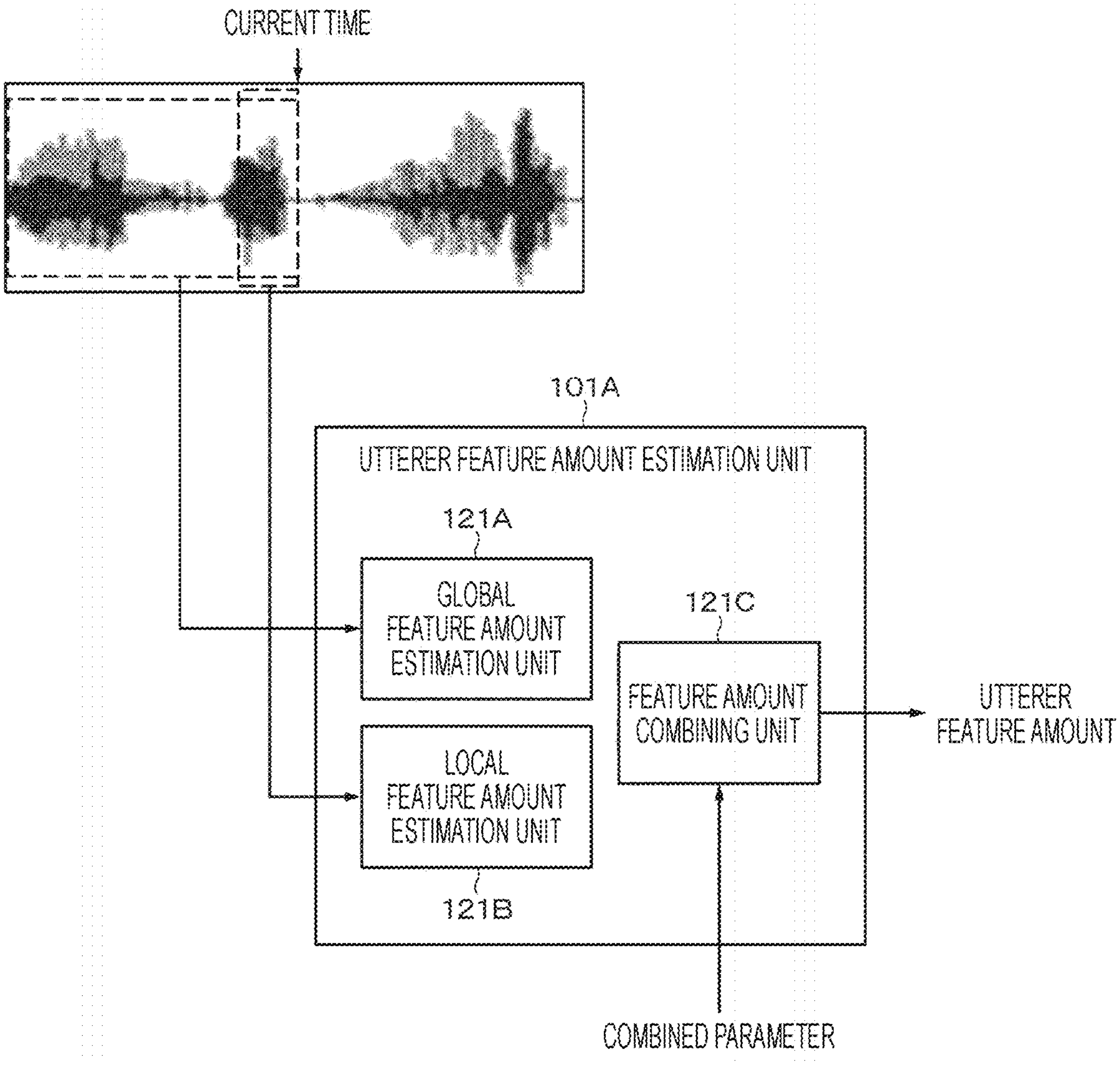
FIG. 6 is a diagram for describing an example of processing performed in association with a voice quality conversion process performed in the embodiment.

In this regard, as illustrated in FIG. 6, for example, the utterer feature amount estimation unit 101A includes an utterer feature amount estimation unit (hereinafter, appropriately referred to as a global feature amount estimation unit 121A) that uses long-time information for a predetermined time or more, an utterer feature amount estimation unit (hereinafter, appropriately referred to as a local (phoneme) feature amount estimation unit 121B) that uses short-time information for a time shorter than the predetermined time, and a feature amount combining unit 121C. Then, utterer feature amounts can be obtained using both the global feature amount estimation unit 121A and the local feature amount estimation unit 121B. The utterer feature amounts obtained from both the estimation units are combined by the feature amount combining unit 121C and used to obtain a final utterer embedding. A weighted linear combination, an on-spherical linear combination, or the like can be used for the combination, and a combining weight parameter can be obtained from a duration, an input signal, or the like. For example, an utterer embedding $e^{id}$ can be obtained as follows.

$$e^{id}=\alpha(T,x)F^{short}(x^{short})+(1-\alpha(T,x))F(x)$$

Here, T is an input length from the start of conversion. Here, α can also be obtained as follows depending only on T.

$$\alpha(T)=(1-\alpha_\infty)\frac{e^{-\frac{T}{T_0}}}{e}+\alpha_\infty$$

Alternatively, it can be obtained from an input x using a neural network like α(x), or can be obtained using any information of T or x.

Next, processing to handle a singing mistake will be described. The above-described real-time processing has a premise that the singing content included in the original song at the time of inference and the user's singing content coincide with each other (assumes the parallel data). On the other hand, the user may erroneously sing a song or the like, and this premise is not necessarily established. In a case where an utterer embedding is obtained between phonemes that are largely different by the method using only the short-time input described above, the quality of conversion may be greatly deteriorated.

Figure 7:
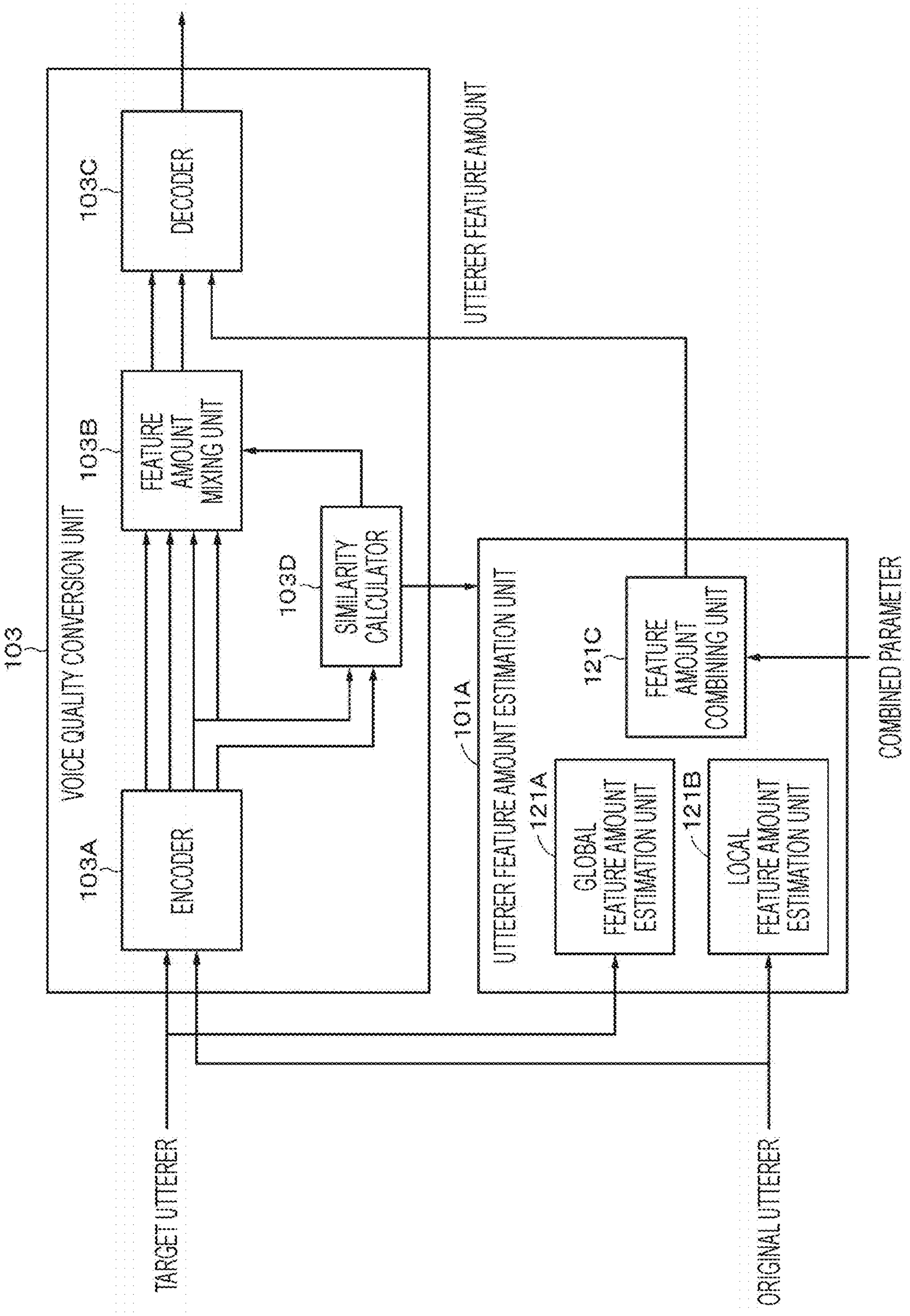
FIG. 7 is a diagram for describing another example of the processing performed in association with the voice quality conversion process performed in the embodiment.

In this regard, in a case where the present processing is performed, a similarity calculator 103D is provided in the voice quality conversion unit 103 as illustrated in FIG. 7. The similarity calculator 103D calculates a similarity of a content embedding $e^{cont}$ between a target singer and an original singer. A calculation result obtained by the similarity calculator 103D is supplied to the utterer feature amount estimation unit 101A.

The utterer feature amount estimation unit 101A changes a combining coefficient between a global feature amount and a local feature amount at the time of utterer feature amount estimation (a weight for each utterer feature amount estimated by each utterer feature amount estimation unit) and a weight for mixing of other feature amounts in accordance with the similarity. Specifically, speech contents are different in a case where the similarity is low, and thus, a weight of for the combination of utterer feature amounts based on the short-time information is reduced to lower the degree of dependence. In other words, a processing result of the global feature amount estimation unit 121A is mainly used. Furthermore, in the mixing of other feature amounts, excessive conversion is suppressed by increasing a weight with respect to a feature amount of an original utterer, thereby suppressing significant deterioration in a sound quality.

Next, a mechanism for making a separated sound source robust will be described. In general, data for learning of singing voice conversion is preferably clean without noise. On the other hand, in the present disclosure, a voice of singing of the target utterer is a voice obtained by sound source separation, and includes noise caused by this separation. Therefore, the estimation accuracy of each embedding is deteriorated due to the noise, and a sound quality of a converted voice is likely to include noise. In order to prevent this, a method of constructing a robust system against sound source separation noise will be described.

The robustness against the sound source separation noise can be realized by applying a constraint during learning of an encoder, a decoder, and an utterer feature amount estimation unit such that embedding vectors extracted from a voice obtained by sound source separation and an original clean voice are the same. Specifically, when a clean voice signal is x, an accompaniment signal is b, and a sound source separator is h( ), a regularization term $$L_{reg}=\|E(x)-E(h(x+b))\|_p$$

is added to an objective function of learning.

Here, E is an encoder or a feature amount extractor. A calculation regarding a loss function $L_{rec}$ related to reconstruction enables learning of the encoder 103A such that a feature amount extraction result from the separated voice coincides with that from a clean voice while keeping an output of the decoder 103C clean by using only the clean voice.

It is preferable to perform all the processes performed in association with the voice quality conversion process described above, but some processes may be performed or are not necessarily performed.

MODIFIED EXAMPLES

Although the embodiment of the present disclosure has been described above, the present disclosure is not limited to the above-described embodiment, and various modifications can be made without departing from the gist of the present disclosure.

Figure 8:
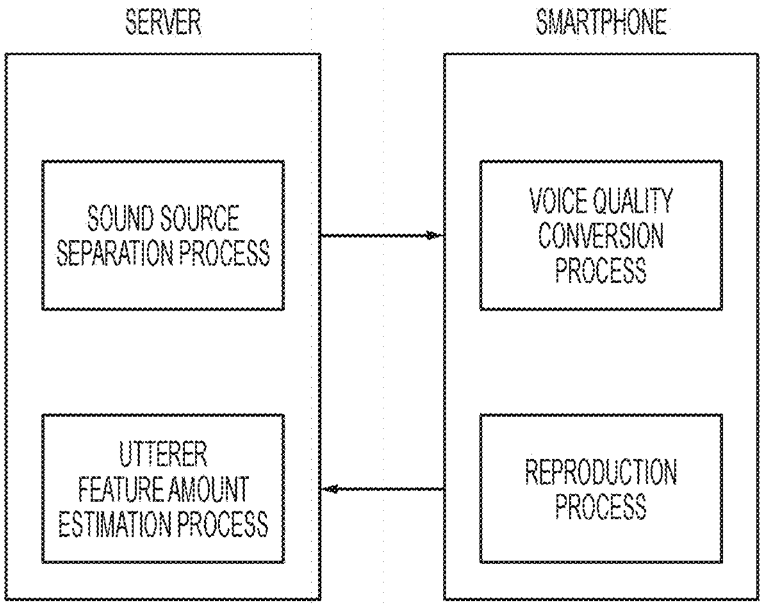
FIG. 8 is a view for describing a modified example.
Figure 9:
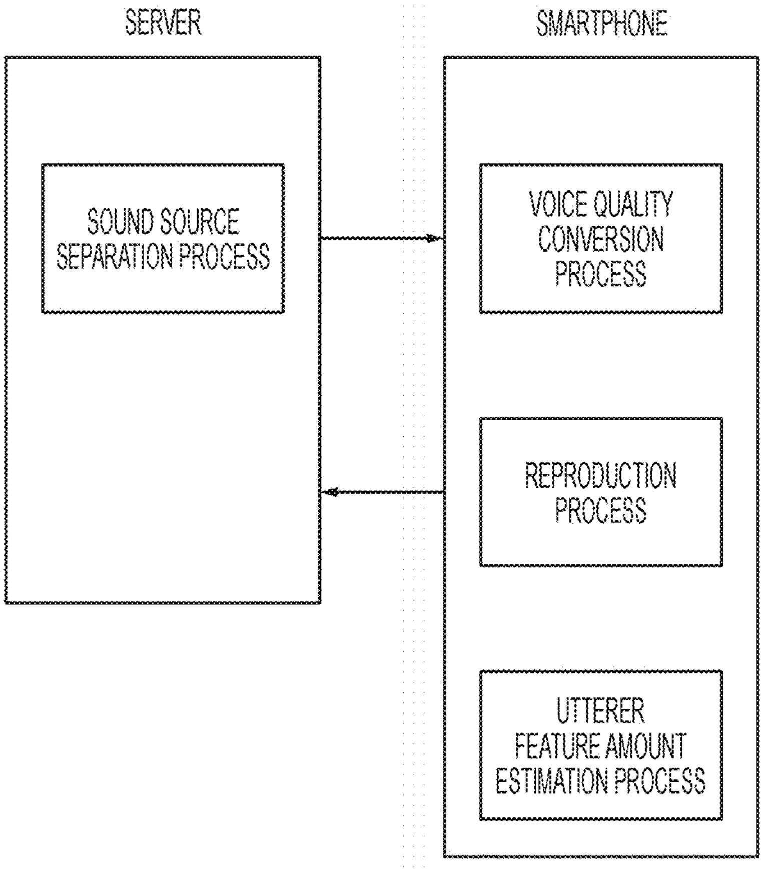
FIG. 9 is a view for illustrating a modified example.

Not all the processes described in the embodiment need to be performed by the smartphone 100. Some processes may be performed by an apparatus different from the smartphone 100, for example, a server. For example, as illustrated in FIG. 8, the sound source separation process and the utterer feature amount estimation process may be performed by the server, and the voice quality conversion process and the reproduction process may be performed by the smartphone. Furthermore, as illustrated in FIG. 9, the sound source separation process may be performed by the server, and the voice quality conversion process, the reproduction process, and the utterer feature amount estimation process may be performed by the smartphone. A processing result is transmitted and received between the server and the smartphone via a network.

Furthermore, the present disclosure can also be realized by any mode such as an apparatus, a method, a program, or a system. For example, by enabling download of a program that performs a function described in an above-described embodiment and by an apparatus, which does not have the function described in the embodiment, downloading and installing the program, control described in the embodiment can be performed in the apparatus. The present disclosure can also be realized by a server that distributes such a program. Furthermore, the items described in each of the embodiments and the modified examples can be combined as appropriate. Furthermore, the contents of the present disclosure are not to be construed as being limited by the effects exemplified in the present specification.

The present disclosure may have the following configurations.

(1)

An information processing apparatus including:

a voice quality conversion unit that performs sound source separation of a vocal signal and an accompaniment signal from a mixed sound signal and performs voice quality conversion using a result of the sound source separation.

(2)

The information processing apparatus according to (1), in which a first vocal signal is separated from the mixed sound signal by the sound source separation, a collected second vocal signal is input to the voice quality conversion unit, and the voice quality conversion unit brings one vocal signal of the first vocal signal and the second vocal signal closer to another vocal signal.

(3)

The information processing apparatus according to (2), in which a change amount that brings the one vocal signal closer to the another vocal signal is settable.

(4)

The information processing apparatus according to (2), further including an utterer feature amount estimation unit that estimates a feature amount related to an utterer, in which the voice quality conversion unit includes an encoder and a decoder.

(5)

The information processing apparatus according to (4), in which the feature amount related to the utterer is a feature amount corresponding to a feature that does not change with time, the encoder extracts, from an input vocal signal, a feature amount corresponding to a feature that changes with time, and the decoder generates a vocal signal on the basis of the feature amount estimated by the utterer feature amount estimation unit and the feature amount extracted by the encoder.

(6)

The information processing apparatus according to (5), in which the feature amount corresponding to the feature that does not change with time is utterer information, and the feature amount corresponding to the feature that changes with time includes at least one of sound pitch information, volume information, or speech information.

(7)

The information processing apparatus according to (6), in which the feature amount is defined by an embedding vector.

(8)

The information processing apparatus according to (7), in which the encoder extracts an embedding vector of the feature amount corresponding to the feature that changes with time by using a learning model obtained by performing learning for obtaining an embedding vector from a feature amount reflecting only a specific feature or learning for extracting only a specific feature from a vocal signal.

(9)

The information processing apparatus according to any one of (6) to (8), in which the utterer feature amount estimation unit estimates the feature amount of the utterer by using a learning model obtained by learning for estimating utterer information of a predetermined utterer on the basis of a vocal signal of the utterer.

(10)

The information processing apparatus according to any one of (6) to (8), in which the utterer feature amount estimation unit estimates the feature amount of the utterer by using a learning model obtained by learning for estimating utterer information of the utterer on the basis of a predetermined vocal signal.

(11)

The information processing apparatus according to any one of (4) to (10), in which the utterer feature amount estimation unit includes a first utterer feature amount estimation unit and a second utterer feature estimation unit, the information processing apparatus further including a feature amount combining unit that combines a feature amount related to the utterer estimated by the first utterer feature amount estimation unit and a feature amount related to the utterer estimated by the second utterer feature estimation unit.

(12)

The information processing apparatus according to (11), in which the first utterer feature amount estimation unit estimates the feature amount related to the utterer on the basis of a vocal signal for a predetermined time or more, and the second utterer feature amount estimation unit estimates the feature amount related to the utterer on the basis of a vocal signal for a time shorter than the predetermined time.

(13)

The information processing apparatus according to (11), in which a combining coefficient in the feature amount combining unit is changed in accordance with a similarity between the first vocal signal and the second vocal signal.

(14)

The information processing apparatus according to (13), in which the combining coefficient is a weight for each of the feature amount related to the utterer estimated by the first utterer feature amount estimation unit and the feature amount related to the utterer estimated by the second utterer feature amount estimation unit.

(15)

An information processing method including performing, by a voice quality conversion unit, sound source separation of a vocal signal and an accompaniment signal from a mixed sound signal and performing voice quality conversion using a result of the sound source separation.

(16)

A program for causing a computer to execute an information processing method including performing, by a voice quality conversion unit, sound source separation of a vocal signal and an accompaniment signal from a mixed sound signal and performing voice quality conversion using a result of the sound source separation.

REFERENCE SIGNS LIST

100 Smartphone
102 Sound source separation unit
101A Utterer feature amount estimation unit
101B Utterer feature amount mixing unit
103 Voice quality conversion unit
103A Encoder
103C Decoder
103D Similarity calculator
121A Global feature amount estimation unit
121B Local feature amount estimation unit

The invention claimed is:

1. An information processing apparatus comprising:

circuitry including an encoder and a decoder and configured to perform sound source separation of a vocal signal and an accompaniment signal from a mixed sound signal, perform voice quality conversion using a result of the sound source separation, the sound separation including separation of a first vocal signal from the mixed sound signal, bring one vocal signal of the first vocal signal and a second vocal signal closer to another vocal signal, and estimate a feature amount related to an utterer, wherein the feature amount related to the utterer corresponds to a feature that does not change with time, the encoder is configured to extract, from an input vocal signal, a feature amount corresponding to a feature that changes with time, and the decoder is configured to generate a vocal signal based on the estimated feature amount and the feature amount extracted by the encoder.

2. The information processing apparatus according to claim 1, wherein the circuitry is configured to receive the second vocal signal.

3. The information processing apparatus according to claim 2, wherein a change amount that brings the one vocal signal closer to the another vocal signal is settable.

4. The information processing apparatus according to claim 1, wherein the circuitry is configured to combine a first feature amount related to the utterer and a second feature amount related to the utterer.

5. The information processing apparatus according to claim 4, wherein the circuitry estimates the first feature amount related to the utterer for a predetermined time or more, and estimates the second feature amount for a time shorter than the predetermined time.

6. The information processing apparatus according to claim 4, wherein a combining coefficient is changed in accordance with a similarity between the first vocal signal and the second vocal signal.

7. The information processing apparatus according to claim 6, wherein the combining coefficient is a weight for each of the estimated first feature amount and the estimated second feature amount related to the utterer.

8. The information processing apparatus according to claim 1, wherein the feature amount corresponding to the feature that does not change with time is utterer information, and the feature amount corresponding to the feature that changes with time includes at least one of sound pitch information, volume information, and/or speech information.

9. The information processing apparatus according to claim 8, wherein the circuitry is configured to estimate the feature amount of the utterer using a learning model obtained by learning for estimating utterer information of a predetermined utterer.

10. The information processing apparatus according to claim 8, wherein the circuitry is configured to estimate the feature amount of the utterer using a learning model obtained learning for estimating utterer information of the utterer based on a predetermined vocal signal.

11. The information processing apparatus according to claim 8, wherein the feature amount is defined by an embedding vector.

12. The information processing apparatus according to claim 11, wherein the encoder is configured to extract an embedding vector of the feature amount corresponding to the feature that changes with time using a learning model obtained by performing learning for obtaining an embedding vector from a feature amount reflecting only a specific feature or learning for extracting only a specific vocal feature.

13. An information processing method comprising:

performing, using a processor configured to implement an encoder and a decoder, sound source separation of a vocal signal and an accompaniment signal from a mixed sound signal;

performing, using the processor, voice quality conversion using a result of the sound source separation;

bringing, using the processor, one vocal signal of the first vocal signal and a second vocal signal closer to another vocal signal;

estimating, using the processor, a feature amount related to an utterer;

extracting from an input vocal signal, using the encoder, a feature amount corresponding to a feature that changes with time; and generating a vocal signal based on the estimated feature amount and the feature amount extracted using the decoder, wherein the feature amount related to the utterer corresponds to a feature that does not change with time.

14. The method according to claim 13, wherein said estimating the feature amount of the utterer is performed using a learning model obtained learning for estimating utterer information of a predetermined utterer.

15. The method according to claim 13, further comprising combining, using the processor, a first feature amount related to the utterer and a second feature amount related to the utterer.

16. A non-transitory computer-readable storage medium having stored thereon instructions that, when executed by one or more processors, causes the one or more processors to perform a method implementing an encoder and a decoder, the method comprising:

performing, sound source separation of a vocal signal and an accompaniment signal from a mixed sound signal;

performing voice quality conversion using a result of the sound source separation;

bringing one vocal signal of the first vocal signal and a second vocal signal closer to another vocal signal;

estimating a feature amount related to an utterer;

extracting from an input vocal signal, using the encoder, a feature amount corresponding to a feature that changes with time;

generating a vocal signal based on the estimated feature amount and the feature amount extracted using the decoder, wherein the feature amount related to the utterer corresponds to a feature that does not change with time.

17. The non-transitory computer-readable storage medium according to claim 16, wherein said estimating the feature amount of the utterer is performed using a learning model obtained by learning for estimating utterer information of the utterer based on a predetermined vocal signal.

18. The non-transitory computer-readable storage medium according to claim 16, wherein the method further comprises combining a first feature amount related to the utterer and a second feature amount related to the utterer.

* * * * *